US012044205B2

(12) United States Patent
Baviloliaie et al.

(10) Patent No.: US 12,044,205 B2
(45) Date of Patent: Jul. 23, 2024

(54) OPTIMIZED INTERLAYER FOR A SPAR CAP FOR A WIND TURBINE BLADE

(71) Applicants: LM Wind Power A/S, Kolding (DK); BLADE DYNAMICS LIMITED, Eastleigh (GB); BLADE DYNAMICS LLLP, New Orleans, LA (US)

(72) Inventors: Madhi Baviloliaie, Kolding (DK); Jeppe Jørgensen, Kolding (DK); Rama Razeghi, Eastleigh (GB); Michael Koefoed, Kolding (DK); Jens Zangenberg Hansen, Kolding (DK); Thomas Merzhaeuser, Salzbergen (DE); Amir Riahi, New Orleans, LA (US); Andrew M. Rodwell, New Orleans, LA (US)

(73) Assignees: LM WIND POWER A/S, Kolding (DK); BLADE DYNAMICS LIMITED, Eastleigh (GB); BLADE DYNAMICS LLLP, New Orleans, LA (US)

(*) Notice: Subject to any disclaimer, the term of this patent is extended or adjusted under 35 U.S.C. 154(b) by 72 days.

(21) Appl. No.: 17/798,998

(22) PCT Filed: Apr. 28, 2021

(86) PCT No.: PCT/EP2021/061190
§ 371 (c)(1),
(2) Date: Aug. 11, 2022

(87) PCT Pub. No.: WO2021/219755
PCT Pub. Date: Nov. 4, 2021

(65) Prior Publication Data
US 2023/0072647 A1 Mar. 9, 2023

(30) Foreign Application Priority Data

Apr. 28, 2020 (WO) ................. PCT/EP2020/061761
Jul. 24, 2020 (GB) .................................... 2011495

(51) Int. Cl.
F03D 1/06 (2006.01)
B29C 70/00 (2006.01)
(Continued)

(52) U.S. Cl.
CPC .............. F03D 1/0675 (2013.01); B32B 5/12 (2013.01); B32B 2262/0253 (2013.01);
(Continued)

(58) Field of Classification Search
CPC .. F03D 1/0675; F03D 1/065; B29L 2031/085; B29C 70/443; B29C 70/0035;
(Continued)

(56) References Cited

U.S. PATENT DOCUMENTS

| 5,100,713 A | 3/1992 | Homma et al. | |
|---|---|---|---|
| 2012/0093656 A1* | 4/2012 | Esaki | F03D 1/0675 416/229 R |

(Continued)

FOREIGN PATENT DOCUMENTS

| DE | 102014104266 A1 | 10/2015 |
|---|---|---|
| DE | 102016009640 A1 | 2/2018 |

(Continued)

Primary Examiner — Eric J Zamora Alvarez
(74) Attorney, Agent, or Firm — Nath, Goldberg & Meyer; Tanya E. Harkins

(57) ABSTRACT

An interlayer sheet for a spar cap is provided. The interlayer sheet includes a first fibre layer having a first plurality of fibres with a first upper fibre surface and a first lower fibre surface, and a second fibre layer having comprising a second plurality of fibres with a second upper fibre surface and a second lower fibre surface. The first fibre layer is arranged on top of the second fibre layer, such that the first lower fibre (Continued)

surface is in contact with the second upper fibre surface. The first fibre layer is of a different characteristic than the second fibre layer. A number of the interlayer sheets may be arranged between a plurality of pre-cured fibre-reinforced elements to make a spar cap for a wind turbine blade.

8 Claims, 6 Drawing Sheets

(51) Int. Cl.
  *B29C 70/08* (2006.01)
  *B29C 70/52* (2006.01)
  *B32B 5/02* (2006.01)
  *B32B 5/06* (2006.01)
  *B32B 5/12* (2006.01)
(52) U.S. Cl.
  CPC . *B32B 2262/0276* (2013.01); *B32B 2262/101* (2013.01); *B32B 2262/106* (2013.01); *B32B 2603/00* (2013.01); *F05B 2240/30* (2013.01); *F05B 2280/6013* (2013.01)
(58) Field of Classification Search
  CPC ... B29C 70/52; B29C 70/08; B32B 2262/106; B32B 5/26; B32B 2260/046; B32B 2262/101; B32B 2262/0276; B32B 5/024; B32B 2603/00; B32B 5/022; B32B 2260/023; B32B 2262/0261; B32B 5/12; B32B 5/06; B32B 7/02; B32B 7/09; B29D 99/0028; B29D 99/0025; F05B 2280/6003; F05B 2240/30; F05B 2280/6001; F05B 2280/6013; Y02E 10/72

See application file for complete search history.

(56) References Cited

U.S. PATENT DOCUMENTS

| | | | |
|---|---|---|---|
| 2014/0178204 A1* | 6/2014 | Livingston | B29C 70/443 29/889.7 |
| 2017/0082089 A1 | 3/2017 | Yarbrough et al. | |
| 2018/0223798 A1* | 8/2018 | Caruso | B29D 99/0025 |
| 2018/0345602 A1 | 12/2018 | Beraud et al. | |
| 2018/0361689 A1* | 12/2018 | Elilis | B64D 45/02 |
| 2019/0211806 A1* | 7/2019 | Girolamo | B29D 99/0025 |
| 2020/0300216 A1* | 9/2020 | Girolamo | B29D 99/0028 |

FOREIGN PATENT DOCUMENTS

| | | |
|---|---|---|
| EP | 1473132 A2 | 11/2004 |
| EP | 2636897 A1 | 9/2013 |
| EP | 3002355 A1 | 4/2016 |
| EP | 3060385 B1 | 10/2017 |
| EP | 3477097 A1 | 5/2019 |
| WO | 2009083531 A1 | 7/2009 |
| WO | 2020103991 A1 | 5/2020 |

\* cited by examiner

OPTIMIZED INTERLAYER FOR A SPAR CAP FOR A WIND TURBINE BLADE

This is a National Phase Application filed under 35 U.S.C. 371 as a national stage of PCT/EP2021/061190, filed Apr. 28, 2021, an application claiming the benefit of European Application No. PCT/EP2020/061761, filed Apr. 28, 2020, and Great Britain Application No. 2011495.5, filed Jul. 24, 2020, the content of each of which is hereby incorporated by reference in its entirety.

FIELD

The present disclosure relates to an interlayer sheet for a spar cap. The present disclosure also relates to a spar cap comprising such an interlayer, and a wind turbine blade comprising such a spar cap.

BACKGROUND

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 metres in length.

The shell halves of wind turbine blades are usually manufactured using blade moulds. First, a blade gel coat or primer is applied to the mould. Subsequently, fibre reinforcement material is placed into the mould in layers followed by arrangement of other elements within the shell halves, such as core elements, load-carrying spar caps, internal shear webs and the like. The resulting shell halves are resin infused and assembled by being glued together substantially along a chord plane of the blade.

The spar caps may be laid up directly in the wind turbine blade moulds with the other fibre-reinforcing elements or in a separate offline mould, where they are resin infused and then subsequently lifted into the main blade shell mould, which is then infused with resin.

The spar caps may comprise a plurality of stacked pultruded carbon fibre elements or profiles and interlayer material arranged between the pultruded carbon fibre elements. The presence of interlayers between the pultruded profiles is used for infusibility of the stack of pultruded carbon fibre elements with resin. The interlayers normally consist of glass or carbon fibre sheets to provide structural bridging and strength in the gap between neighbouring pultrusion profiles. However, the high fibre volume in the interlayer material also results in low fracture toughness, which is one of the key aspects of building reliable spar caps for wind turbine blades.

Hence, a spar cap for a wind turbine blade having increased fracture toughness and methods for manufacturing such a spar cap would be advantageous.

SUMMARY

It is an object of the present invention to provide a spar cap for a wind turbine blade which at least ameliorates some of the aforementioned problems or provides a useful alternative to the prior art.

The present inventors have found that one or more of said objects may be achieved in a first aspect of the invention relating to an interlayer sheet for a spar cap comprising:

a first fibre layer comprising a first plurality of fibres, having a first upper fibre surface and a first lower fibre surface, a second fibre layer comprising a second plurality of fibres, having a second upper fibre surface and a second lower fibre surface, wherein the first fibre layer is arranged on top of the second fibre layer, such that the first lower fibre surface is in contact with the second upper fibre surface, and wherein the first fibre layer is of a different characteristic than the second fibre layer. For example, the first plurality of fibres is a different characteristic, such as a different type of fibres than the second plurality of fibres.

Conventionally, interlayer sheets for spar caps comprise one fibre material optimal for one criteria of the spar cap, such as infusibility, fracture toughness, ply drop fatigue etc. The concept of the present invention is to use interlayer sheets with at least two different fibre layers, each fibre layer providing a desired effect to the interlayer sheet. The at least two different fibre layers have different characteristics, e.g. different fibre types, fibre ratio, density, etc. Each characteristic may provide a desired effect to the interlayer In that way, the present invention allows an interlayer to be optimized for different criteria at the same time. In some embodiments the first plurality of fibres is of a different fibre type than the second plurality of fibres. In some embodiments a first fibre ratio of the first fibre layer is different than a second fibre ratio of the second fibre layer. In some embodiments a first density of the first fibre layer is different than a second density of the second fibre layer.

Particularly, it is desired that at least one fibre layer comprises a characteristic, e.g. a fibre type, density etc. which increases the fracture toughness of the spar cap to a desired level, whereas at least one fibre layer comprises a characteristic, e.g. a fibre type, density etc. which increases the structural integrity of the spar cap to a desired level. Any fibre material which can achieve the above effects may be used within the scope of the present invention.

In the above and the following, upper and lower surfaces are referred to. It is recognized that this definition is used to define the mutual arrangement of the various fibre layers when the interlayer sheet is arranged on a substantially horizontal surface.

In some embodiments, the first plurality of fibres in the first fibre layer comprises a plurality of polymeric filaments, such as polyester filaments, preferably thermoplastic polyester filaments, or polypropylene filaments or polyethylene filaments. In some embodiments, the first plurality of fibres essentially consists of a plurality of polymeric filaments, such as polyester filaments, preferably thermoplastic polyester filaments, or polypropylene filaments or polyethylene filaments. The use of polymeric filaments in one or more fibre layers of the interlayer sheet promotes resin infusion and provides wetting of the area between carbon pultrusions and reduces the number of defects. Furthermore, the presence of polymeric filaments, such as polyester filaments, reduces the fractures toughness. In preferred embodiments, the plurality of first fibres is polyester fibres/filaments.

In some embodiments, the second plurality of fibres in the second fibre layer comprises glass fibres and/or carbon fibres. In some embodiments, the second plurality of fibres essentially consists of glass fibres. In other embodiments, the second plurality of fibres essentially consists of carbon fibres. Carbon fibres and glass fibres both provide structural bridging and strength in the gap between neighbouring fibre-reinforced elements. However, due to the presence of a first fibre layer in the interlayer sheet, the fracture toughness is not reduced to the same level than with conventional carbon fibre/glass fibre interlayer sheets.

In some embodiments, the first plurality of fibres and/or the second plurality of fibres comprises a plurality of conductive strands, such as copper strands. In some embodiments, the first plurality of fibres essentially consists of a plurality of conductive strands, such as copper strands. In some embodiments, the second plurality of fibres essentially consists of a plurality of conductive strands, such as copper strands.

In some embodiments, the interlayer sheet may comprise more than two fibre layers, such as three, four, five or even six fibre layers.

In some embodiments, the interlayer sheet further comprises a third fibre layer comprising a third plurality of fibres, having a third upper fibre surface and a third lower fibre surface, wherein the first and second fibre layers are arranged on top of the third fibre layer, such that the second lower fibre surface is in contact with the third upper fibre surface and such that the second fibre layer is sandwiched between the first and third fibre layers.

The third fibre layer may have the same characteristics i.e. be identical or substantially identical to the first fibre layer and/or the second fibre layer. However, the third fibre layer may also have a different characteristic than the first and/or the second fibre layer.

The third plurality of fibres may be of the same type as the first plurality of fibres, and/or may be different from the second plurality of fibres. However, the third plurality of fibres may also be different from both the first and the second plurality of fibres.

In some embodiments, the third plurality of fibres comprises polymeric filaments, such as polyester filaments, preferably thermoplastic polyester filaments, or polypropylene filaments or polyethylene filaments. In other embodiments, the third plurality of fibres essentially consists of polymeric filaments, such as polyester filaments, preferably thermoplastic polyester filaments, or polypropylene filaments or polyethylene filaments. In some embodiments, the third plurality of fibres comprises or essentially consists of glass fibres and/or carbon fibres.

In some embodiments, the third plurality of fibres comprises a plurality of conductive strands, such as copper strands. In some embodiments, the third plurality of fibres essentially consists of a plurality of conductive strands, such as copper strands.

Each fibre layer, including the first fibre layer and/or the second fibre layer and/or the third fibre layer, may be a unidirectional fabric, a bidirectional/biaxial fabric or a tridirectional/triaxial fabric. In a unidirectional fabric the fibres are all arranged along a first direction. In a bidirectional/biaxial fabric, a plurality of primary fibres is arranged along a first direction and a plurality of secondary fibres is arranged along a second direction, e.g. perpendicularly to the first direction, on top of the plurality of primary fibres. In a tridirectional/triaxial fabric, a plurality of primary fibres is arranged along a first direction and a plurality of secondary fibres arranged along a second direction is positioned on top of the plurality of primary fibres. Furthermore, a plurality of tertiary fibres is arranged along a third direction, on top of the plurality of secondary fibres. The fibres in a unidirectional, bidirectional or tridirectional fabric may be maintained relative to each other by a binding agent or be stitched together by a thread.

Even though a bidirectional fabric or a tridirectional fabric may comprise several "fibre layers" themselves, such a fabric is considered a single fibre layer within the scope of the present invention, as it comprises a single type of fibres. Even if the fabric comprises several fibre types, a bidirectional or tridirectional fabric is considered a single layer within the scope of the present invention.

In some embodiments, each fibre layer, including the first fibre layer, the second fibre layer and the third fibre layer, is a net and/or an open-meshed fabric e.g. comprising woven fibres. A net and/or an open-meshed fabric may comprise different types of fibres, such as one, two or three different types of fibres, and still be considered a single layer within the scope of the present invention. In some embodiments, the first and/or second and/or third fibre layers are meshes or grids.

In some embodiments, each fibre layer, including the first fibre layer and/or the second fibre layer and/or the third fibre layer, is a veil. A veil is a thin, fluffy layer essentially consisting of randomly oriented fibres. The fibres in the veil may be maintained relative to each other by a binding agent. A veil often has high permeability, promotes resin infusion and has good adhesion properties. A veil may comprise different types of fibres in one fibre layer, such as one, two or three different types of fibres, and still be considered a single layer within the scope of the present invention.

The different fibre layers in the interlayer sheet, including the first fibre layer and the second fibre layer and optionally additional layers, such as the third fibre layer, may be held together by a binding agent or be stitched together by a thread to form a coherent interlayer sheet, configured to be arranged between two pre-cured fibre-reinforced elements or between two layers of pre-cured fibre-reinforced elements in the spar cap.

In a preferred embodiment, the first fibre layer and the third fibre layer are polyester veils and the second fibre layer is a bidirectional glass-fibre fabric. Such an interlayer provides the desired structural integrity and fracture toughness to the spar cap. Furthermore, the first and third fibre layers in the interlayer sheet promote resin infusion and adhesion between pre-cured fibre-reinforced elements and the interlayer sheet.

In some embodiments, the interlayer sheet comprises a plurality of carbon fibres forming part of an upper interlayer surface as well as an lower interlayer surface. Thus, the plurality of carbon fibres extends through the interlayer sheet i.e. the carbon fibres extend through all fibre layers present in the interlayer sheet, including the first fibre layer and the second fibre layer and optionally also further fibre layers such as the third fibre layer. In this way, electrical conductivity through the interlayer may be obtained, which facilitates electron flow between elements, such as pultruded elements, when sandwiched therebetween.

In a second aspect, the present invention relates to a spar cap for a wind turbine blade, comprising:
  a plurality of pre-cured fibre-reinforced elements including at least a first pre-cured fibre-reinforced element and a second pre-cured fibre-reinforced element; and
  a number of interlayer sheets according to the first aspect of the present invention, arranged between the plurality of pre-cured fibre-reinforced elements.

Each of the pre-cured fibre-reinforced elements, including the first pre-cured fibre-reinforced element and the second pre-cured fibre-reinforced element, has a length in a longitudinal direction, a width in a width direction, and a thickness in a thickness direction. The length of each fibre-reinforced element may be longer than the width and the width may be larger than the thickness. The length may be more than 2 metres, such as more than 5 metres, such as more than 10 metres, such as more than 20 metres, such as more than 40 metres, such as more than 70 metres. The width may be between 20-200 mm, such as between 50-150 mm, such as 100 mm. The height may be between 2-10 mm, such as 5 mm.

Furthermore, each of the plurality of pre-cured fibre-reinforced elements has a lower surface and an upper surface extending in the longitudinal direction and in the width direction. Each of the plurality of pre-cured fibre-reinforced elements also has a first side surface and a second side surface extending in the longitudinal direction and the thickness direction. Each of the plurality of pre-cured fibre-reinforced elements has a first end surface and a second end surface extending in the width direction and in the thickness direction.

The first pre-cured fibre-reinforced element and the second pre-cured fibre-reinforced element may be arranged such that the lower surface of the first pre-cured fibre-reinforced element is facing the second upper surface of the second pre-cured fibre-reinforced element in the spar cap. The interlayer sheet according to the first aspect of the present invention is arranged between the first lower surface of the first pre-cured fibre-reinforced element and the second upper surface of the second pre-cured fibre-reinforced element. The interlayer sheet may be arranged with the first fibre layer, the second fibre layer or the third fibre layer contacting the first pre-cured fibre-reinforced element or with the first fibre layer, the second fibre layer or the third fibre layer contacting the second pre-cured fibre-reinforced element.

In some embodiments, the plurality of pre-cured fibre-reinforced elements comprises reinforcement fibres and a first cured resin. The reinforcement fibres are oriented in the longitudinal direction of the fibre-reinforced elements. Preferably, the reinforcement fibres are carbon fibres and the plurality of pre-cured fibre-reinforced elements are pultruded carbon planks, such as pultruded carbon fibre reinforced plastic planks. However, in some embodiments, the plurality of pre-cured fibre-reinforced elements are extruded elements comprising carbon fibres and the first cured resin.

The spar cap may extend in a length direction between a first end and a second end of the spar cap, in a width direction between a first side and a second side of the spar cap, and in a thickness direction between a lower surface and an upper surface of the spar cap.

In some embodiments, the spar cap comprises an array of pre-cured fibre-reinforced elements, including a plurality of spar cap layers, each comprising a row of pre-cured fibre-reinforced elements between the first and the second side, preferably each extending between the first and second ends of the spar cap. The pre-cured fibre-reinforced elements are arranged adjacent to each other in each spar cap layer. Preferably, the pre-cured fibre-reinforced elements of a first spar cap layer are separated from the pre-cured fibre-reinforced elements of a second spar cap layer by at least one interlayer sheet according to the present invention. In some embodiments, more than one interlayer sheet may separate the first and second spar cap layers.

An interlayer sheet according to the present invention may be arranged between the pre-cured fibre-reinforced elements in a width direction (horizontal) as explained above. However, it may also be arranged between pre-cured fibre-reinforced elements in a thickness direction (vertical). Thus, the first pre-cured fibre-reinforced element and the second pre-cured fibre-reinforced element may be adjacent elements in the thickness direction or in the width direction.

In preferred embodiments, the plurality of pre-cured fibre-reinforced elements and the plurality of interlayer sheets are embedded in a second cured resin to form the spar cap. The spar cap may be laid up directly in a wind turbine blade mould with other fibre-reinforcing elements and then infused with the second resin or it may be laid up in a separate offline mould, where it is infused with the second resin and then subsequently lifted into the main blade shell mould.

In a third aspect, the present invention relates to a wind turbine blade comprising a spar cap according to the second aspect of the present invention.

The wind turbine blade comprises a blade shell with a spar cap according to the second aspect of the present invention integrally formed with or attached to the blade shell. The wind turbine blade preferably comprises two spar caps according to the second aspect of the present invention. For example, the wind turbine blade may comprise a first spar cap in a first blade shell part and a second spar cap in a second blade shell part. The first spar cap may be a pressure side spar cap of a pressure side blade shell part. The second spar cap may be a suction side spar cap of a suction side blade shell part.

In some embodiments, the wind turbine blade comprises a first spar cap integrally formed with or attached to a pressure side shell of the blade, a second spar cap integrally formed with or attached to a suction side shell of the blade, and one or more shear webs connected between the first spar cap and the second spar cap.

In a fourth aspect, the present invention relates to a method of manufacturing a spar cap comprising the steps of:
a) providing a plurality of pre-cured fibre-reinforced elements including a first pre-cured fibre-reinforced element and a second pre-cured fibre-reinforced element;
b) providing a plurality of interlayer sheets, including a first interlayer sheet, according to the first aspect of the present invention;
c) arranging the first interlayer sheet in between the first pre-cured fibre-reinforced element and the second pre-cured fibre-reinforced element such that the pre-cured fibre-reinforced elements are separated by the first interlayer sheet;
d) infusing a first resin between the first pre-cured fibre-reinforced elements and the second pre-cured fibre-reinforced element; and
e) curing the resin in order form the spar cap.

In some embodiments, step c) of manufacturing a spar cap includes arranging the plurality of pre-cured fibre-reinforced elements and interlayer sheets in a pre-form mould.

In some embodiments, step c) of manufacturing a spar cap includes arranging the plurality of pre-cured fibre-reinforced elements and interlayer sheets in a wind turbine blade mould.

In some embodiments, step d) includes covering the plurality of pre-cured fibre-reinforced elements and interlayer sheets in the pre-form mould with a cover, such as a vacuum bag, to form a mould cavity and supplying the first resin into the mould cavity.

In some embodiments, step d) includes covering the wind turbine blade mould with a cover, such as a vacuum bag, to form a mould cavity and supplying the first resin into the mould cavity.

The step of infusing the blade mould cavity with resin is preferably based on vacuum-assisted resin transfer moulding (VARTM). When the desired elements have been arranged in the pre-form mould or wind turbine blade mould, a vacuum bag may be arranged on top of the elements arranged on the moulding surface, and the vacuum bag may be sealed against the blade mould to form a mould cavity. Then the blade mould cavity may be infused with resin. Optionally, the step of resin infusion is followed by curing.

In some embodiments, the first cured resin and the second cured resin are of the same type, i.e. the cured resin of the pre-cured fibre-reinforced elements are the same type as the cured resin embedding the pre-cured fibre-reinforced elements and the interlayer material between the pre-cured fibre-reinforced elements. In other embodiments, the first cured resin and the second cured resin are different types of resin.

It will be understood that any of the above-described features may be combined in any embodiment of the invention. In particular, embodiments described with regard to the interlayer sheet may also apply to the spar cap and the wind turbine blade, and vice versa. Furthermore, the embodiments described with regard to the spar cap and wind turbine blade may also apply to the method of manufacturing a spar cap or wind turbine blade and vice versa.

DETAILED DESCRIPTION OF THE INVENTION

Embodiments of the disclosure will be described in more detail in the following with regard to the accompanying figures. The figures show one way of implementing the present disclosure and are not to be construed as being limiting to other possible embodiments falling within the scope of the attached claim set.

FIG. 1 is a schematic diagram illustrating a wind turbine,

FIG. 2 is a schematic diagram illustrating a wind turbine blade and a spar cap structure arranged within the wind turbine blade, FIG. 3 is a schematic diagram illustrating the simplest embodiment of an interlayer sheet according to the present invention, FIG. 4 is a schematic diagram illustrating a preferred embodiment of an interlayer sheet according to the present invention, FIG. 5 is a schematic diagram illustrating two embodiments of a spar cap according to the present invention, and FIG. 6 is a schematic diagram illustrating an embodiment of an interlayer sheet comprising a plurality of carbon fibres extending through the interlayer.

DETAILED DESCRIPTION

Various exemplary embodiments and details are described hereinafter with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a conventional modern upwind wind turbine according to the so-called "Danish concept" with a tower 400, a nacelle 600 and a rotor with a substantially horizontal rotor shaft. The rotor includes a hub 800 and three blades 1000 extending radially from the hub 800, each having a blade root 1600 nearest the hub and a blade tip 1400 furthest from the hub 800.

FIG. 2A shows a schematic view of a first embodiment of a wind turbine blade 1000. The wind turbine blade 1000 has the shape of a conventional wind turbine blade and comprises a root region 3000 closest to the hub, a profiled or an airfoil region 3400 furthest away from the hub and a transition region 3200 between the root region 3000 and the airfoil region 3400. The blade 1000 comprises a leading edge 1800 facing the direction of rotation of the blade 1000, when the blade is mounted on the hub, and a trailing edge 2000 facing the opposite direction of the leading edge 1800.

The airfoil region 3400 (also called the profiled region) has an ideal or almost ideal blade shape with respect to generating lift, whereas the root region 3000 due to structural considerations has a substantially circular or elliptical cross-section, which for instance makes it easier and safer to mount the blade 1000 to the hub. The diameter (or the chord) of the root region 3000 may be constant along the entire root area 3000. The transition region 3200 has a transitional profile gradually changing from the circular or elliptical shape of the root region 3000 to the airfoil profile of the airfoil region 3400. The chord length of the transition region 3200 typically increases with increasing distance r from the hub. The airfoil region 3400 has an airfoil profile with a chord extending between the leading edge 1800 and the trailing edge 2000 of the blade 1000. The width of the chord decreases with increasing distance r from the hub.

A shoulder 4000 of the blade 1000 is defined as the position where the blade 1000 has its largest chord length. The shoulder 4000 is typically provided at the boundary between the transition region 3200 and the airfoil region 3400.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 2B is a schematic diagram illustrating a cross-sectional view of an exemplary wind turbine blade 1000 showing a cross-sectional view of the airfoil region of the wind turbine blade 1000 as illustrated by the line. The wind turbine blade 1000 comprises a leading edge 1800, a trailing edge 2000, a pressure side 2400, a suction side 2600, a first spar cap 10a, and a second spar cap 10b. The wind turbine blade 1000 comprises a chord line 3800 between the leading edge 1800 and the trailing edge 2000. The wind turbine blade 1000 comprises shear webs 4200, such as a leading edge shear web and a trailing edge shear web. The shear webs 4200 could alternatively be a spar box with spar sides, such as a trailing edge spar side and a leading edge spar side. The spar caps 10a, 10b may comprise carbon fibres, while the rest of the shell parts 2400, 2600 may comprise glass fibres.

FIG. 3 shows different views of an embodiment of an interlayer sheet according to the present invention. FIG. 3A is a schematic diagram illustrating a three-dimensional view of an embodiment of an interlayer sheet 20 for a spar cap 10 according to the present invention. FIG. 3B shows a cross-sectional view A-A of the interlayer sheet 20 of FIG. 3A, and FIG. 3C shows an exploded view of FIG. 3B.

The interlayer sheet 20 of the embodiment shown in FIG. 3 comprises a first fibre layer 30 and a second fibre layer 40.

The first fibre layer 30 comprises a first plurality of fibres, and the second fibre layer 40 comprises a second plurality of fibres.

Importantly, the first fibre layer has a different characteristic than the second fibre layer. For example, the first plurality of fibres is a different type of fibres than the second plurality of fibres. Alternatively or additionally, fibre ratio and/or density of the first fibre layer may be different than fibre ratio and/or density of the second fibre layer. In that way, each fibre layer in the interlayer sheet 20 has different properties. Particularly, it is desired that at least one fibre layer increases the fracture toughness of the spar cap to a desired level, whereas at least one layer increases the structural integrity of the spar cap to a desired level. Any fibre material which can achieve the above effects may be used within the scope of the present invention. For example, the first plurality of fibres may comprise or essentially consist of polymeric filaments, such as polyester filaments, preferably thermoplastic polyester filaments, or polypropylene filaments or polyethylene filaments. A fibre layer comprising such fibres would increase the fracture toughness and promote resin infusion. The second plurality of fibres may comprise or essentially consist of glass fibres or carbon fibres. A fibre layer comprising such fibres provides structural integrity.

As can be seen in FIG. 3C, the first fibre layer 30 has a first upper fibre surface 31 and a first lower fibre surface 32. In the same way, the second fibre layer 40 has a second upper fibre surface 41 and a second lower fibre surface 42.

In FIGS. 3A and 3B, the first fibre layer 30 is arranged on top of the second fibre layer 40, such that the first lower fibre surface 32 is in contact with the second upper fibre surface 41.

The interlayer sheet in FIGS. 3A-3C is illustrated as a substantially square sheet for illustrative purposes. However, the interlayer sheet may also have other shapes and is preferably substantially rectangular.

FIG. 4 shows different views of another embodiment of an interlayer sheet according to the present invention. FIG. 4A is a schematic diagram illustrating a three-dimensional view of an embodiment of an interlayer sheet 20 for a spar cap 10 according to the present invention. FIG. 4B shows a cross-sectional view B-B of the interlayer sheet 20 of FIG. 4A, and FIG. 4C shows an exploded view of FIG. 4B.

The interlayer sheet 20 in the embodiment shown in FIG. 4 comprises a first fibre layer 30, a second fibre layer 40 and a third fibre layer 50.

As can be seen in FIG. 4C, the first fibre layer 30 has a first upper fibre surface 31 and a first lower fibre surface 32. In the same way, the second fibre layer 40 has a second upper fibre surface 41 and a second lower fibre surface 42, and the third fibre layer 50 has a third upper fibre surface 51 and a third lower fibre surface 52.

In FIGS. 4A and 4B, the first fibre layer 30 is arranged on top of the second fibre layer 40, such that the first lower fibre surface 32 is in contact with the second upper fibre surface 41. Furthermore, the first and second fibre layers 30, 40 are arranged on top of the third fibre layer 50, such that the second lower fibre surface 42 is in contact with the third upper fibre surface 51 and such that the second fibre layer 40 is sandwiched between the first and third fibre layers 30, 50. The interlayer sheet in FIG. 4 is illustrated as a substantially square for illustrative purposes. However, the interlayer sheet may also have other shapes and is preferably substantially rectangular.

The first fibre layer 30 comprises a first plurality of fibres, and the second fibre layer 40 comprises a second plurality of fibres, and the third fibre layer 50 comprises a third plurality of fibres.

Importantly, the first fibre layer has a different characteristic than the second fibre layer e.g the first plurality of fibres is a different type of fibres than the second plurality of fibres. In that way, each fibre layer in the interlayer sheet 20 has different properties. Particularly, it is desired that at least one fibre layer increases the fracture toughness of the spar cap to a desired level, whereas at least one layer increases the structural integrity of the spar cap to a desired level. Any fibre material which can achieve the above effects may be used within the scope of the present invention. For example, the first plurality of fibres may comprise or essentially consist of polymeric filaments, such as polyester filaments, preferably thermoplastic polyester filaments, or polypropylene filaments or polyethylene filaments. A fibre layer comprising such fibres increases the fracture toughness and promote resin infusion. The second plurality of fibres may comprise or essentially consist of glass fibres or carbon fibres. A fibre layer comprising such fibres provides structural integrity. The third plurality of fibres may be of the same or a different type than the first fibre layer. Preferably, the third layer comprises or essentially consists of polymeric filaments, such as polyester filaments, preferably thermoplastic polyester filaments, or polypropylene filaments or polyethylene filaments, like the first fibre layer 30. Since the interlayer sheet 20 is configured to be arranged in a spar cap between a first and a second pre-cured fibre-reinforced element 60, 70, such an interlayer sheet 20 promotes resin infusion in areas between the interlayer sheet 20 and the pre-cured fibre-reinforced elements 60, 70, further ensuring adhesion between the fibre-reinforced elements 60, 70 and the interlayer sheet 20. In a preferred embodiment, the first fibre layer and the third fibre layer are polyester veils, and the second fibre layer is a bidirectional glass-fibre fabric.

FIG. 5A is a schematic diagram showing a cross-sectional view of a spar cap according to the simplest embodiments of the present invention. FIG. 5B shows an exploded view of the spar cap of FIG. 5A.

Figure 1:
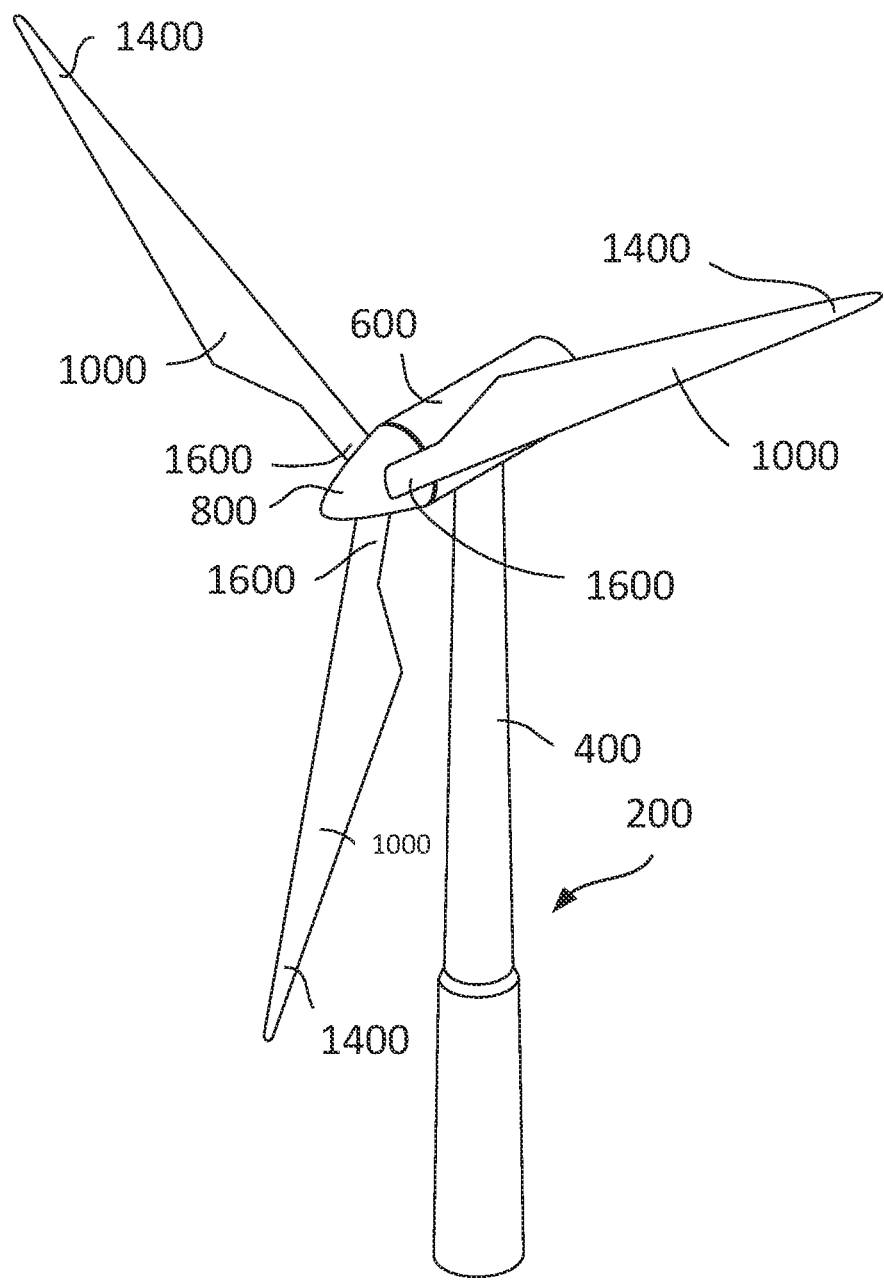

The spar cap illustrated in FIGS. 5A and 5B comprises a first pre-cured fibre-reinforced element 60 and a second pre-cured fibre-reinforced element 70. Furthermore, the spar cap 10 comprises an interlayer sheet 20 with a first and a second fibre layer 20, 30 arranged between the first and second pre-cured fibre-reinforced elements 60, 70. The interlayer sheet 20 is a sheet as described in relation to FIG. 3. However, it may also be an interlayer sheet 20 as described in relation to FIG. 4, or another interlayer sheet within the scope of the present invention.

The first and second pre-cured fibre-reinforced elements 60, 70 each have a length in a longitudinal direction, a width in a width direction, and a height in a height direction. The length is larger than the width, and the width is larger than the height.

Furthermore, the first and second pre-cured fibre-reinforced elements 60, 70 each have a lower surface 62, 72 and an upper surface 61, 71 extending in the longitudinal direction and the width direction. FIGS. 5A and 5B are cross-sectional views showing the width and height of the spar cap 10, but not the length.

The first pre-cured fibre-reinforced element 60 and the second pre-cured fibre-reinforced element 70 are arranged such that the lower surface of the first pre-cured fibre-reinforced element 62 is facing the upper surface of the second pre-cured fibre-reinforced element 71, and the interlayer sheet 20 is sandwiched between the lower surface of the first pre-cured fibre-reinforced element and the upper surface of the second pre-cured fibre-reinforced element.

Figure 3:
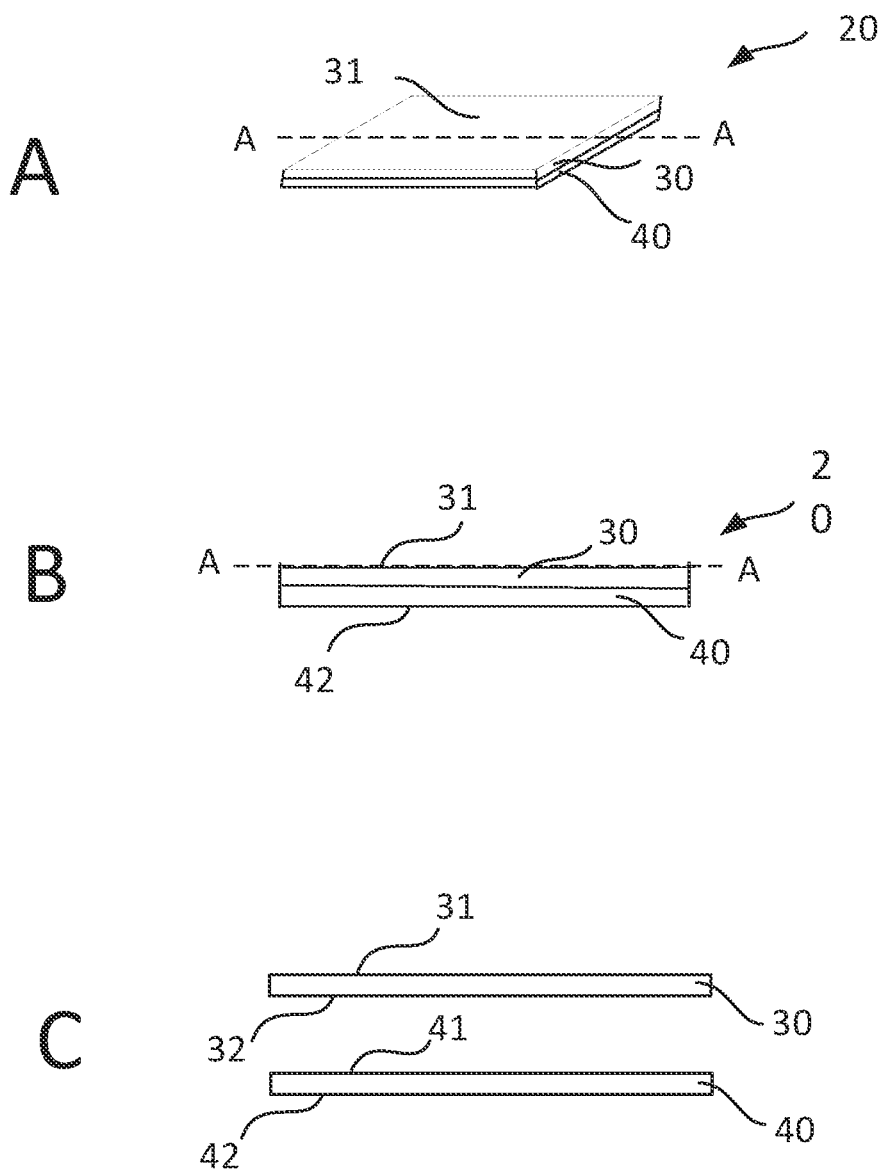
Figure 4:
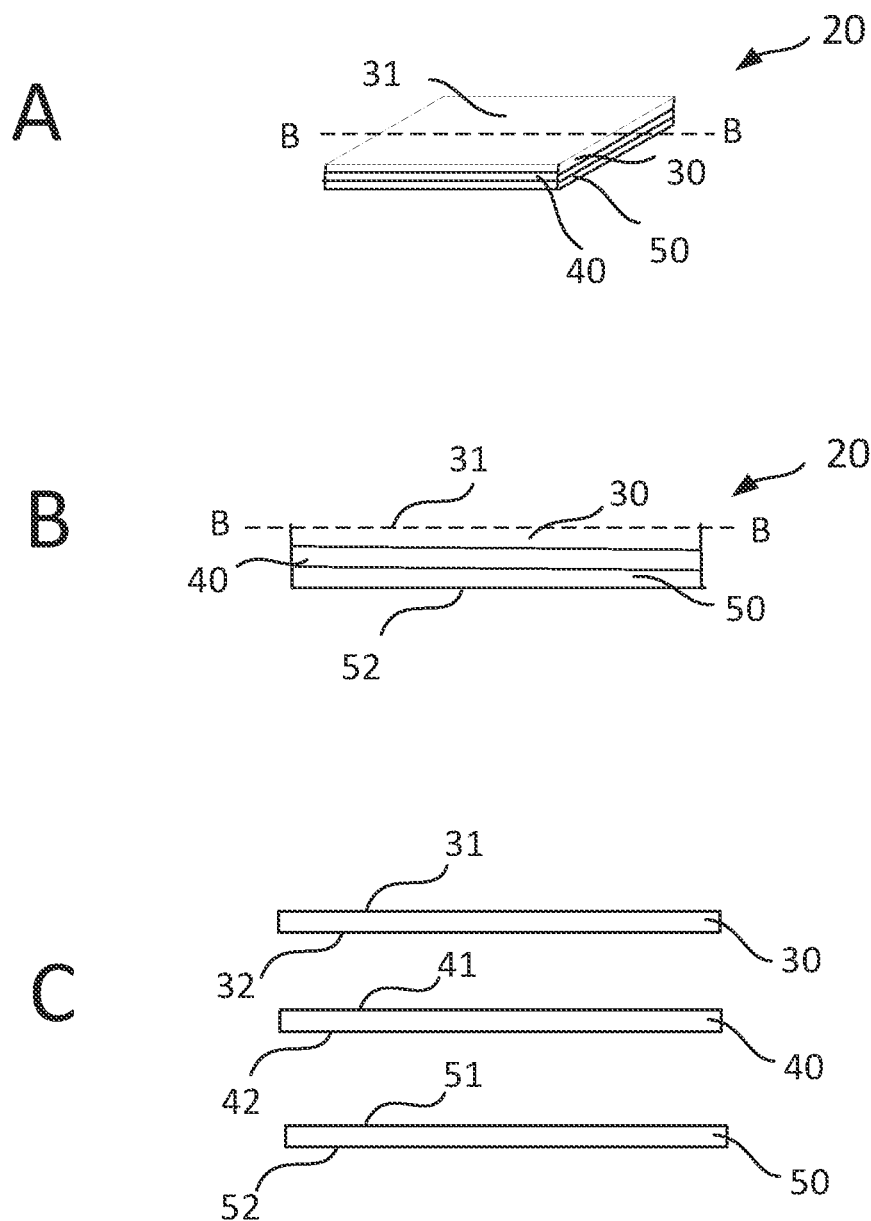

For an interlayer sheet 20, as described in relation to FIG. 3, comprising a first fibre layer 30 and a second fibre layer 40, either the first or second fibre layer 30, 40 may be in contact with the first fibre-reinforced element 60 and either the first or second fibre layer may be in contact with the second fibre-reinforced element 70. For an interlayer sheet 20, as described in relation to FIG. 4, comprising a first fibre layer 30, a second fibre layer 40 and a third fibre layer 50, either the first or third fibre layer 30, 40 may be in contact with the first fibre-reinforced element 60, and either the first or second fibre layer may be in contact with the second fibre-reinforced element 70.

Preferably, the plurality of pre-cured fibre-reinforced elements 60, 70 and the plurality of interlayer sheets 20 are embedded in a first cured resin to form the finished spar cap. This may be done in an offline pre-form mould or directly in a blade mould.

FIG. 5C shows a cross-sectional view of a spar cap according to another embodiment according to the present invention.

Figure 5:
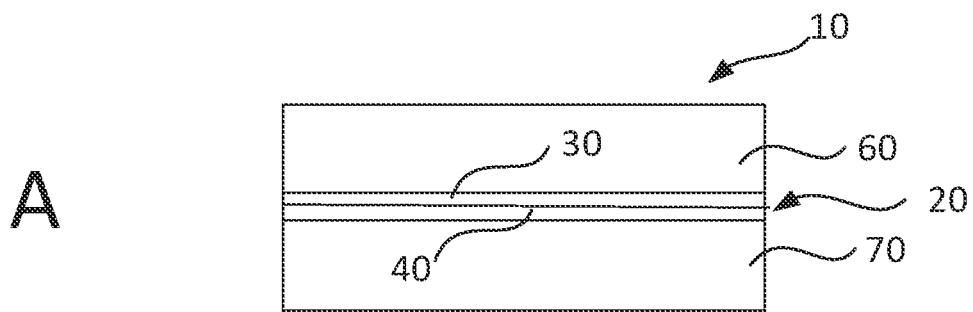
FIG. 5 shows two different embodiments of a spar cap for a wind turbine blade according to the present invention.
Figure 5:
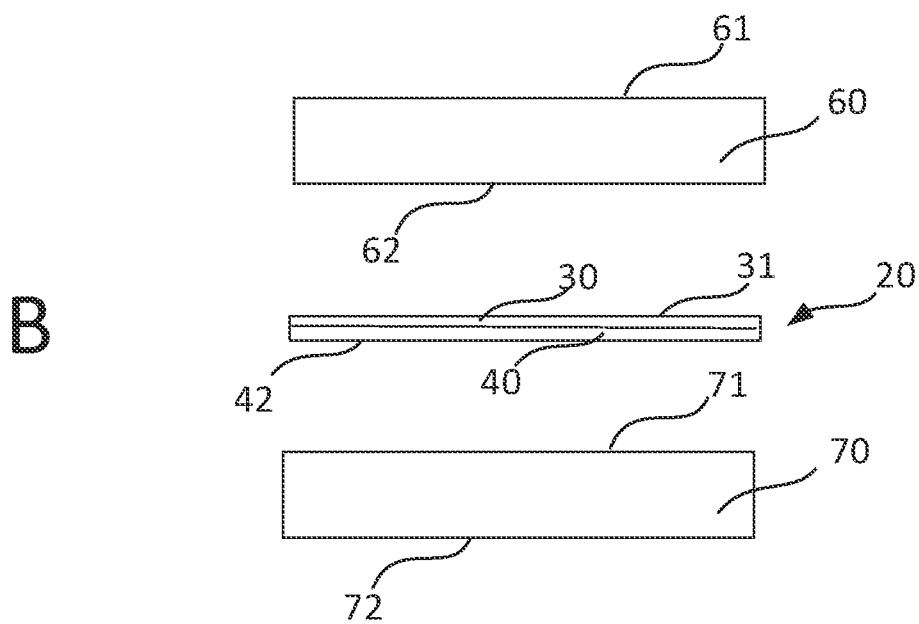
Figure 5:
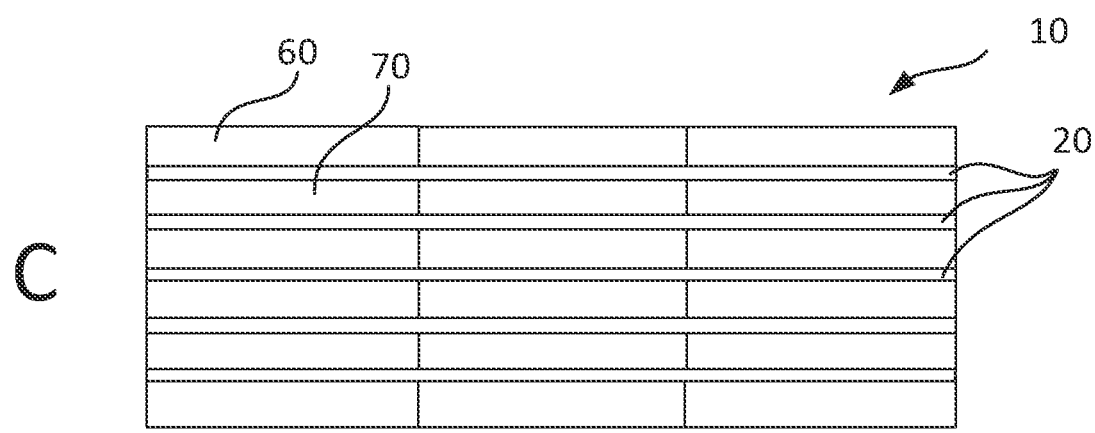

The spar cap illustrated in FIG. 5C comprises an array of pre-cured fibre-reinforced elements 60, 70 including a plurality of spar cap layers arranged on top of each other. Each spar cap layer comprises a row of pre-cured fibre-reinforced elements between a first and a second side of the spar cap (along the width), preferably each extending between the first and second ends of the spar cap (not visible in FIG. 5).

The pre-cured fibre-reinforced elements 60, 70 are arranged adjacent to each other in each spar cap layer. Preferably, the pre-cured fibre-reinforced elements of each spar cap layer are separated from the pre-cured fibre-reinforced elements of a second spar cap layer by at least one interlayer sheet according to the present invention 20. In some embodiments, more than one interlayer sheet may separate the first and second spar cap layers.

Although not specifically illustrated, interlayers may also be provided between adjacent elements in the width direction to facilitate resin flow between elements also in this direction.

Preferably, each of the plurality of pre-cured fibre-reinforced elements 60, 70 is a pultruded carbon plank.

Figure 2:
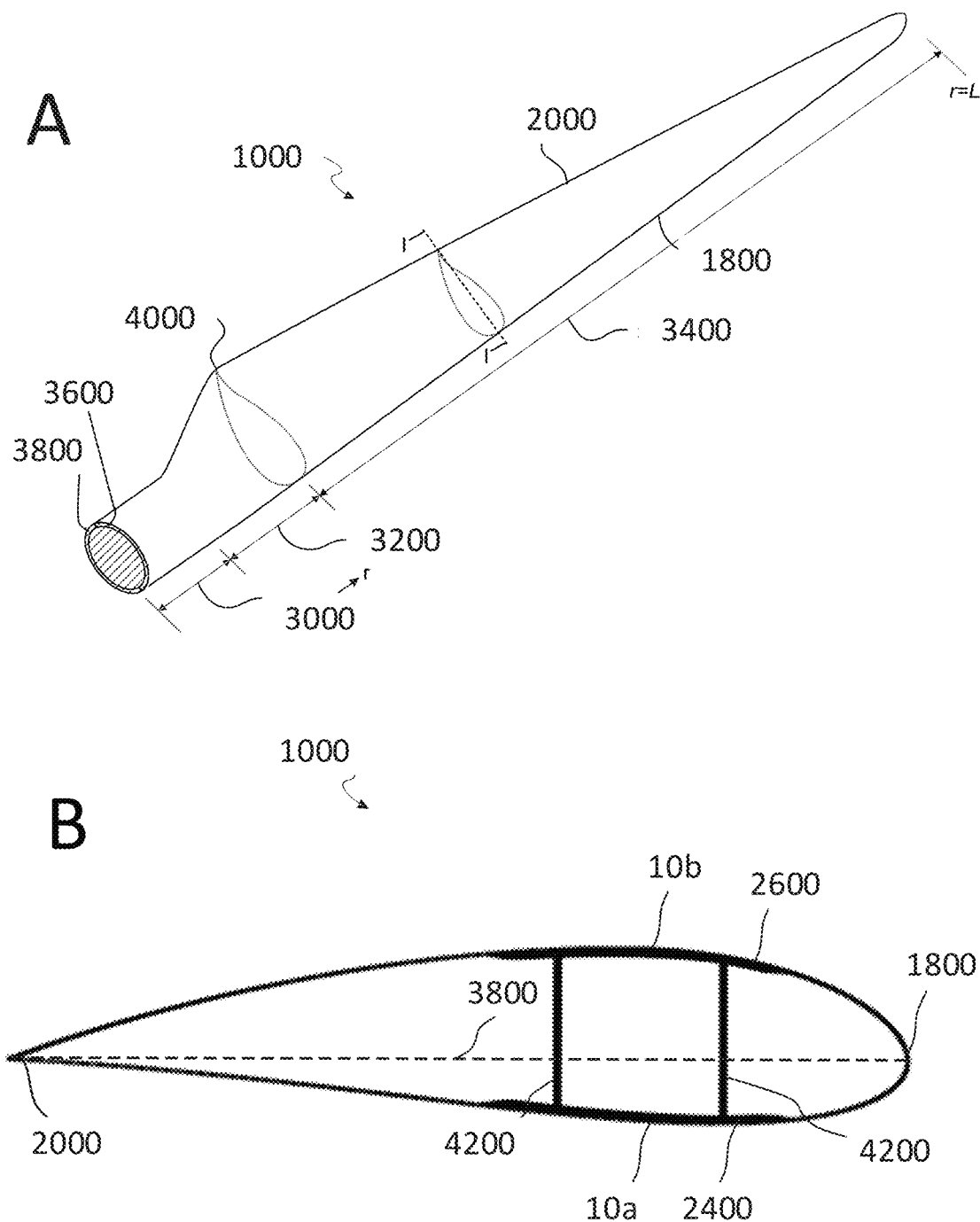

The spar cap illustrated in FIG. 5C may form part of a spar cap arranged in a wind turbine blade 1000, such as the spar caps 10a, 10b of the wind turbine blade 1000 as illustrated in FIG. 2.

Figure 6:
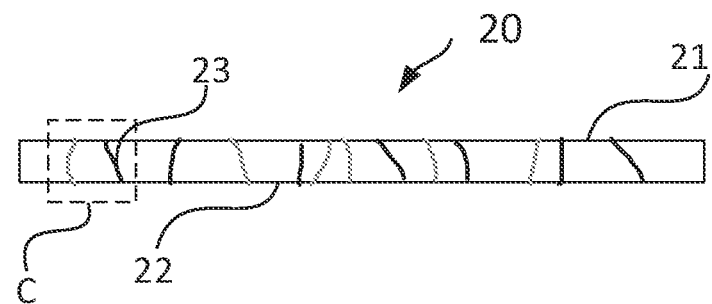
Figure 6:
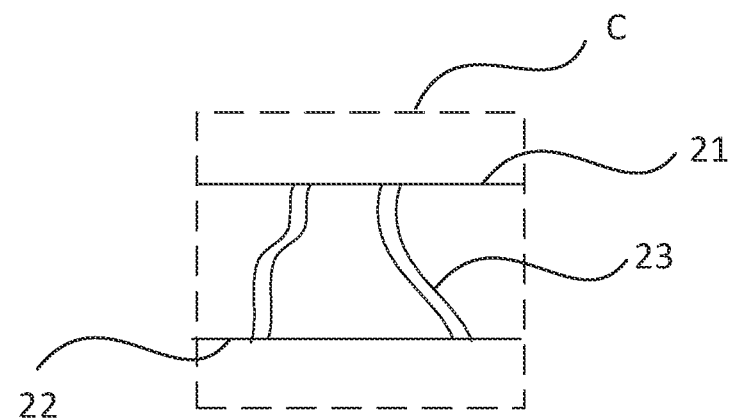

In some embodiments, as illustrated in FIG. 6, the interlayer sheet 20 comprise a plurality of carbon fibres 23 forming part of an upper interlayer surface 21 as well as an lower interlayer surface 22. Thus, the plurality of carbon fibres 23 extend through the interlayer sheet 20. In FIG. 6 the number of fibre layers in the interlayer sheet 20 are not illustrated. However, the carbon fibres 23 extend through all fibre layers present in the interlayer sheet 20, including the first fibre layer and the second fibre layer and optionally also further fibre layers such as a third fibre layer. In this way, electrical conductivity through the interlayer may be obtained, which facilitates electron flow between elements, such as pultruded elements, when sandwiched therebetween.

LIST OF REFERENCE NUMERALS

10 spar cap
10a first spar cap
10b second spar cap
20 interlayer sheet
21 upper interlayer surface
22 lower interlayer surface
23 carbon fibres extending through interlayer sheet
30 first fibre layer
31 first upper fibre surface
32 first lower fibre surface
40 second fibre layer
41 second upper fibre surface
42 second lower fibre surface
50 third fibre layer
51 third upper fibre surface
52 third lower fibre surface
60 first pre-cured fibre-reinforced element
61 first upper surface
62 first lower surface
70 second pre-cured fibre-reinforced element
71 second upper surface
72 second lower surface
200 wind turbine
400 tower
600 nacelle
800 hub
1000 blade
1400 blade tip
1600 blade root
1800 leading edge
2000 trailing edge
2200 pitch axis
2400 pressure side
2600 suction side
3000 root region
3200 transition region
3400 airfoil region
3800 chord line
4000 shoulder/position of maximum chord
4200 shear web

The invention claimed is:

1. A spar cap (10) for a wind turbine blade (1000), comprising:
a plurality of pre-cured fibre-reinforced elements, including a first pre-cured fibre-reinforced element and a second pre-cured fibre-reinforced element; and
a plurality of interlayer sheets (20) arranged between the plurality of pre-cured fibre-reinforced elements, wherein each of the interlayer sheets (20) comprises:
a first fibre layer (30) comprising a first plurality of fibres, having a first upper fibre surface (31) and a first lower fibre surface (32);
a second fibre layer (40) comprising a second plurality of fibres, having a second upper fibre surface (41) and a second lower fibre surface (42);
a third fibre layer (50) comprising a third plurality of fibres, having a third upper fibre surface (51) and a third lower fibre surface (52),
wherein the first fibre layer (30) is arranged on top of the second fibre layer (40), such that the first lower fibre surface (32) is in contact with the second upper fibre surface (41), and wherein the first fibre layer is of a different characteristic than the second fibre layer,
wherein the first and second fibre layers (30, 40) are arranged on top of the third fibre layer (50), such that the second lower fibre surface (42) is in contact with the third upper fibre surface (51) and such that the second fibre layer (40) is sandwiched between the first and third fibre layers (30, 50), and wherein the first fibre layer (30) and the third fibre layer (50) are polyester veils and the second fibre layer (40) is a bidirectional glass-fibre fabric.

2. The spar cap (10) according to claim 1, wherein the different characteristic is fibre type and/or fibre density and/or fibre ratio.

3. The spar cap (10) according to claim 1, wherein the first fibre layer (30) and/or the third fibre layer (50) comprises randomly oriented fibres.

4. The spar cap (10) according to claim 1, wherein the fibres in the first fibre layer (30) and/or the second fibre layer (40) and/or the third fibre layer (50) are maintained relative to each other by a binding agent or are stitched together by a thread.

5. The spar cap (10) according to claim 1, wherein the plurality of pre-cured fibre-reinforced elements and the plurality of interlayer sheets (20) are embedded in a first cured resin and wherein the spar cap (10) extends in a length direction between a first end and a second end of the spar cap, wherein the spar cap has a width direction between a first side and a second side of the spar cap, and wherein the spar cap has a thickness direction between a lower surface and an upper surface of the spar cap.

6. The spar cap (10) according to claim 1, wherein each of the plurality of pre-cured fibre-reinforced elements is a pultruded carbon plank.

7. The spar cap (10) according to claim 1, wherein each of the plurality of pre-cured fibre-reinforced elements has a length in a longitudinal direction, a width in a width direction, and a height in a height direction, wherein the length is longer than the width and the width is longer than the height, wherein each of the plurality of pre-cured fibre-reinforced elements has a lower surface and an upper surface extending in the longitudinal direction and the width direction, and wherein the first pre-cured fibre-reinforced element and the second pre-cured fibre-reinforced element are arranged such that the lower surface of the first pre-cured fibre-reinforced element is facing the upper surface of the second pre-cured fibre-reinforced element and an interlayer sheet (20) of the interlayer sheets (20) is arranged between the lower surface of the first element and the upper surface of the second element.

8. A wind turbine blade (1000) comprising the spar cap (10) according to claim 1.

* * * * *